H. M. PFLAGER.
LOCOMOTIVE ASH PAN.
APPLICATION FILED JULY 17, 1916.

1,267,334.

Patented May 21, 1918.

Inventor
Harry M. Pflager

UNITED STATES PATENT OFFICE.

HARRY M. PFLAGER, OF ST. LOUIS, MISSOURI, ASSIGNOR TO CAST STEEL LOCOMOTIVE ASH PAN COMPANY, OF ST. LOUIS, MISSOURI, A CORPORATION OF DELAWARE.

LOCOMOTIVE ASH-PAN.

1,267,334.

Specification of Letters Patent.    Patented May 21, 1918.

Application filed July 17, 1916. Serial No. 109,782.

*To all whom it may concern:*

Be it known that I, HARRY M. PFLAGER, a citizen of the United States, residing at St. Louis, Missouri, have invented a certain new and useful Improvement in Locomotive Ash-Pans, of which the following is a full, clear, and exact description, such as will enable others skilled in the art to which it appertains to make and use the same, reference being had to the accompanying drawings, forming part of this specification.

My invention relates to locomotive ash pans, particularly those pans which are constructed wholly or partially of cast metal and of the type disclosed in Patent No. 1,114,196 dated October 20, 1914, the principal object of my invention being to provide a locomotive ash pan with means, preferably in the form of ribs or flanges projecting outwardly from the walls of said pan for quickly disseminating the comparatively high degree of heat which is developed within the pan due to the presence of hot ashes.

It will be understood that the greater part, if not all, of the ashes passing through the grate into the ash pan are in an incandescent state, and as a result, a comparatively high degree of heat is produced within the ash pan and transmitted to the walls thereof. This heat if not quickly disposed of will raise, to a considerable extent, the temperature of the walls of the ash pan and cause the same to warp, buckle, and in some cases to fracture.

I propose to provide ribs or flanges projecting outwardly from the walls of the ash pan, thereby providing additional radiating surfaces for the dissemination of the heat developed within the ash pan and in addition to performing this function, said ribs or flanges serve to materially strengthen and rigidify the ash pan structure, thus affording material resistance to any tendency of the walls of the pan to warp or buckle under extreme heat.

With the foregoing and other objects in view, my invention consists in certain novel features of construction and arrangement of parts, hereinafter more fully described, claimed and illustrated in the accompanying drawings, in which—

Referring by numerals to the accompanying drawings, 10 designates the inclined side walls of a hopper which is secured to and depends from the locomotive fire box and secured to the lower portion of this and hopper is the ash pan proper, the same comprising vertically disposed parallel side walls 11 and inclined end walls 12. The usual discharge opening is formed at the lower end of the ash pan, said opening being normally closed by a suitable door (not shown).

Figure 1:
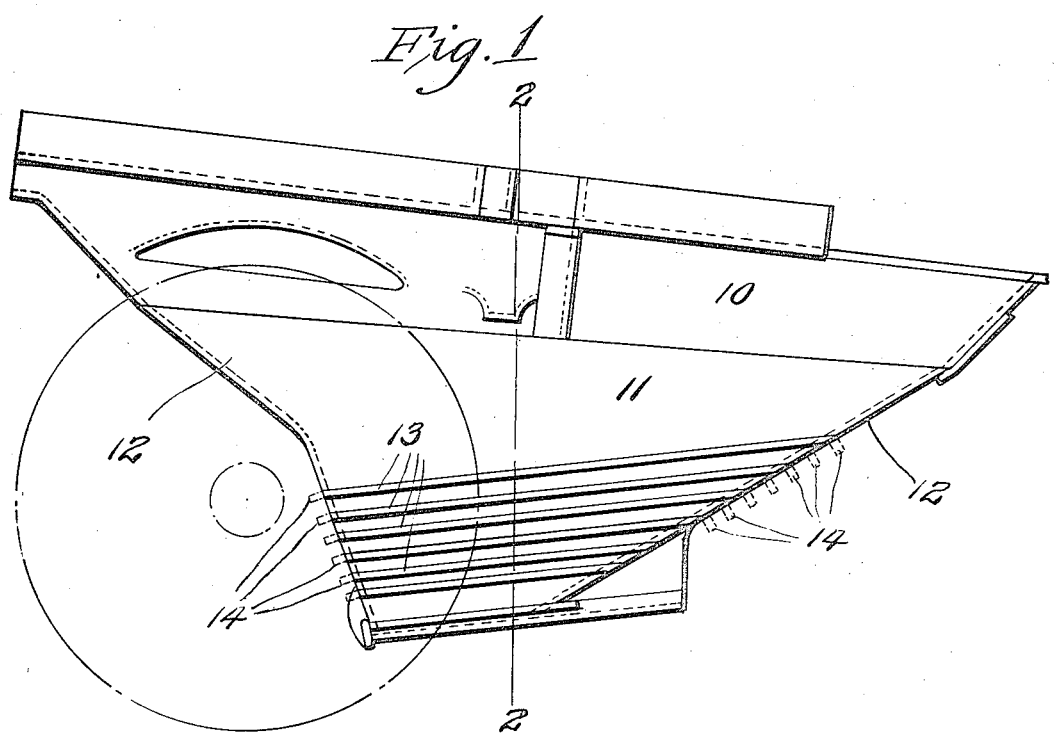
Figure 1 is a side elevational view of an ash pan of my improved construction.
Figure 2:
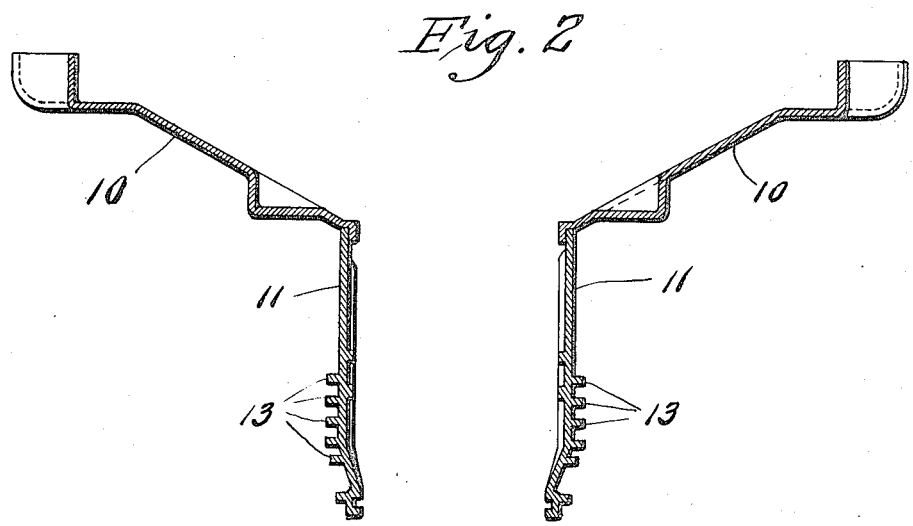
Fig. 2 is a cross sectional view taken approximately on the line 2—2 of Fig. 1.

These side walls 11 are preferably constructed of cast steel and formed integral with or fixed to the lower portions thereof are externally arranged longitudinally disposed outwardly projecting ribs or flanges 13, the same being preferably parallel with each other and with the lower edges of said side walls. By thus arranging the ribs or flanges, they lie substantially lengthwise to the direction of the movement of the air past the ash pan when the locomotive is in service, and thus they offer very little, if any, air or wind resistance. These ribs in addition to providing a substantial amount of radiating surface for disseminating the heat from the contents of the ash pan, materially strengthen the side walls and render them effective against tendency to warp or buckle, as a result of the wide variation of temperatures to which they are subjected. If desired, the ribs 13 may be extended across the end walls 12 as shown by dotted lines 14 in Fig. 1.

It will be readily understood that minor changes in the size, form and construction of the various parts of my improved ash pan can be made and substituted for those herein shown and described, without departing from the spirit of my invention, the scope of which is set forth in the appended claim.

I claim:

As a new article of manufacture, a locomotive ash pan having vertically disposed parallel cast metal side walls and a pair of diverging cast metal end walls, and a plurality of combined strengthening ribs and heat disseminating flanges formed integral with and projecting outwardly from the lower portions of said side walls, which combined ribs and flanges occupy positions parallel with each other and substantially parallel with the lower edges of the walls so that they are disposed lengthwise relative to the direction of movement of air past the side walls while the locomotive is in service.

In testimony whereof I hereunto affix my signature this 13th day of June, 1916.

HARRY M. PFLAGER.